(12) United States Patent
Sannomiya et al.

(10) Patent No.: US 10,744,567 B2
(45) Date of Patent: Aug. 18, 2020

(54) CONTROL DEVICE FOR MACHINE TOOL AND MACHINE TOOL

(71) Applicants: Citizen Watch Co., Ltd., Tokyo (JP); Citizen Machinery Co., Ltd., Nagano (JP)

(72) Inventors: Kazuhiko Sannomiya, Nagano (JP); Takaichi Nakaya, Nagano (JP)

(73) Assignees: CITIZEN WATCH CO., LTD., Tokyo (JP); CITIZEN MACHINERY CO., LTD., Nagano (JP)

(*) Notice: Subject to any disclaimer, the term of this patent is extended or adjusted under 35 U.S.C. 154(b) by 0 days.

(21) Appl. No.: 15/758,080

(22) PCT Filed: Sep. 7, 2016

(86) PCT No.: PCT/JP2016/076230
§ 371 (c)(1),
(2) Date: Mar. 7, 2018

(87) PCT Pub. No.: WO2017/043499
PCT Pub. Date: Mar. 16, 2017

(65) Prior Publication Data
US 2018/0243834 A1 Aug. 30, 2018

(30) Foreign Application Priority Data

Sep. 10, 2015 (JP) .................................. 2015-178832

(51) Int. Cl.
*B23B 7/00* (2006.01)
*B23B 25/06* (2006.01)
(Continued)

(52) U.S. Cl.
CPC .......... *B23B 13/02* (2013.01); *B23Q 15/0075* (2013.01); *B23Q 15/013* (2013.01);
(Continued)

(58) Field of Classification Search
CPC ........... B23B 29/125; B23G 3/00; B24B 1/04; Y10T 82/20; Y10S 82/904
See application file for complete search history.

(56) References Cited

U.S. PATENT DOCUMENTS 4,419,912 A * 12/1983 Sotome ................ B23B 29/125
  82/11.1
4,496,321 A *  1/1985 Kumabe ............ B23Q 11/0039
  433/119
(Continued)

FOREIGN PATENT DOCUMENTS

CN       101691020 A     4/2010
EP         0792707 A1    9/1997
(Continued)

OTHER PUBLICATIONS

Altintas, Y, et al: "Virtual Design and Optimization of Machine Tool Spindles", CIRP ANNALS, vol. 54, No. 1, Jun. 25, 2007 (Jun. 25, 2007), pp. 379-382, XP029790550, ISSN: 0007-8506, D01: 101 016/S0007-8506(7)60127-9.

*Primary Examiner* — Nicole N Ramos
(74) *Attorney, Agent, or Firm* — Birch, Stewart, Kolasch & Birch, LLP

(57) ABSTRACT

The invention provides a control apparatus for a machine tool, which can perform reciprocating vibration in consideration of a vibration frequency, increase flexibility in machining a workpiece, and perform vibration cutting by means of an external spindle or the like without rotating a spindle. The control apparatus and the machine tool include control means. The control means includes an imaginary spindle regarded as a spindle for rotating a workpiece W or a cutting tool. The control means sets the number of rotations of the imaginary spindle and the number of reciprocating vibrations in accordance with a vibration frequency attributable to a cycle during which an operation instruction can be issued.

4 Claims, 10 Drawing Sheets

(51) Int. Cl.
    *B23B 13/02*     (2006.01)
    *B23Q 15/013*     (2006.01)
    *G05B 19/4093*     (2006.01)
    *B23Q 15/007*     (2006.01)
    *B23B 25/02*     (2006.01)

(52) U.S. Cl.
    CPC .......... *G05B 19/4093* (2013.01); *B23B 25/02*
    (2013.01); *G05B 2219/49055* (2013.01); *G05B 2219/49277* (2013.01)

(56) References Cited

U.S. PATENT DOCUMENTS

| | | | | |
|---|---|---|---|---|
| 4,911,044 A * | 3/1990 | Mishiro | ............... | B23B 29/125 82/158 |
| 5,035,142 A * | 7/1991 | Dryga | ............... | G01N 29/12 148/509 |
| 5,778,745 A * | 7/1998 | Furusawa | ............... | B23B 25/02 82/1.11 |
| 5,810,528 A * | 9/1998 | O'Connor | ............... | B23B 29/022 408/143 |
| 5,911,802 A | 6/1999 | Kimura et al. | | |
| 6,234,728 B1 * | 5/2001 | Brun-Picard | ............... | B23B 29/125 408/17 |
| 6,349,600 B1 * | 2/2002 | Davies | ............... | B23Q 17/0976 73/104 |
| 6,694,213 B2 * | 2/2004 | Claesson | ............... | B23B 29/022 409/141 |
| 6,742,422 B1 | 6/2004 | Shinohara | | |
| 6,925,915 B1 * | 8/2005 | Claesson | ............... | B23B 25/02 82/133 |
| 9,981,319 B2 * | 5/2018 | Fronius | ............... | B23Q 1/0009 |
| 2002/0033083 A1 * | 3/2002 | Claesson | ............... | B23B 27/002 82/118 |
| 2002/0083805 A1 * | 7/2002 | Lundblad | ............... | B23B 27/002 82/1.11 |
| 2006/0099039 A1 * | 5/2006 | Maki | ............... | B23B 29/125 408/1 R |
| 2007/0052326 A1 * | 3/2007 | Liu | ............... | B23B 29/125 310/323.18 |
| 2007/0056414 A1 * | 3/2007 | Saeterbo | ............... | B23B 31/005 82/158 |
| 2008/0238255 A1 * | 10/2008 | Lee | ............... | B23B 29/125 310/323.18 |
| 2009/0107308 A1 | 4/2009 | Woody et al. | | |
| 2014/0102268 A1 | 4/2014 | Hariki | | |
| 2014/0121816 A1 * | 5/2014 | Nishimura | ............... | B23G 3/00 700/159 |
| 2014/0216216 A1 * | 8/2014 | Hessenkamper | ............... | B23B 29/125 82/1.11 |
| 2016/0259311 A1 | 9/2016 | Shimamura | | |
| 2018/0036807 A1 * | 2/2018 | Ketelaer | ............... | B23B 29/125 |
| 2018/0257192 A1 * | 9/2018 | Nakaya | ............... | G05B 19/402 |
| 2018/0335765 A1 * | 11/2018 | Tezuka | ............... | G05B 19/404 |

FOREIGN PATENT DOCUMENTS

| | | |
|---|---|---|
| JP | 62-277238 A | 12/1987 |
| JP | 5139591 A | 2/2013 |

* cited by examiner

FIG.5

| INSTRUCTION CYCLE (s) | VIBRATION FREQUENCY f (Hz) |
|---|---|
| 0.004 × 4 | 62.5 |
| 0.004 × 5 | 50 |
| 0.004 × 6 | 41.666 |
| 0.004 × 7 | 35.714 |
| 0.004 × 8 | 31.25 |
| ... | ... |

FIG.8

IMAGINARY SPINDLE IS                               S101 ⎫
IMAGINARY SPINDLE ROTATION START CODE IS  M403 ⎬ GIVEN THAT
IMAGINARY SPINDLE ROTATION STOP CODE IS   M405 ⎭

EXAMPLE OF MACHINING PROGRAM

⋮

S101=3970M403          IMAGINARY SPINDLE ROTATION
                                  START INSTRUCTION

⋮

G△△△  P1  Q2.0  D0.5   VIBRATION START INSTRUCTION

⋮

G△△△  P0                   VIBRATION STOP INSTRUCTION

⋮

M405                          IMAGINARY SPINDLE ROTATION
                                  STOP INSTRUCTION

⋮

CONTROL DEVICE FOR MACHINE TOOL AND MACHINE TOOL

FIELD OF THE INVENTION

The present invention relates to a control apparatus of a machine tool and also relates to the machine tool that machines a workpiece while sequentially separating chips generated during a cutting operation.

BACKGROUND OF THE INVENTION

A conventionally known machine tool includes a spindle configured to hold and rotate a workpiece, a cutting tool configured to cut the workpiece, feeding means configured to feed the cutting tool toward the workpiece in a predetermined feeding direction by moving the spindle and the cutting tool relative to each other, and vibration means configured to vibrate the spindle and the cutting tool relative to each other. An example of this conventional machine tool is described in United States Patent Publication 2014/0102268, published on Apr. 17, 2014. A control apparatus of the machine tool is configured to control the spindle, the feeding means, and the vibration means to drive the machine tool, and to allow the machine tool to machine the workpiece by the rotation of the spindle and the feed movement of the cutting tool with reciprocating vibration toward the workpiece in the feeding direction.

The conventional machine tool is configured so that an operation instruction is issued by a control apparatus at a predetermined cycle. Therefore, the vibration frequency at which the workpiece holding means and the tool rest vibrate relative to each other is defined as a limited value attributable to a cycle during which the operation instruction can be issued by the control apparatus. However, the above vibration frequency is not considered in the conventional machine tool. Therefore, with respect to any number of rotations of the relative rotation, the reciprocating vibration may not be performed at any number of vibrations of the cutting tool relative to the workpiece during one rotation of the workpiece. Also, in the foregoing conventional machine tool, the vibration frequency or the like by the vibration means is set on the premise that the spindle is rotated; therefore, vibration cutting may not be controlled without rotating the spindle.

Thus, the present invention is intended to solve the above problems of the prior art, that is, it is an object of the present invention to provide a control apparatus of a machine tool and the machine tool, which allows reciprocating vibration in consideration of a vibration frequency, increase flexibility in machining a workpiece, and can perform vibration cutting without rotating a spindle.

SUMMARY OF THE INVENTION

According to a first aspect of the present invention, the above problems are solved by a control apparatus of a machine tool, the control apparatus being provided in the machine tool that includes: a cutting tool configured to cut a workpiece; rotating means configured to rotate the cutting tool and the workpiece relative to each other; feeding means configured to feed the cutting tool and the workpiece in a predetermined feeding direction; and vibration means configured to allow relative reciprocating vibration between the cutting tool and the workpiece, the control apparatus including control means configured to allow the machine tool to machine the workpiece by feeding the cutting tool with reciprocating vibration toward the workpiece, wherein the control means includes an imaginary spindle regarded as a spindle for rotating the workpiece or the cutting tool, and the control means is configured to set the number of rotations of the imaginary spindle and the number of vibrations of the reciprocating vibration during one rotation of the imaginary spindle in accordance with the vibration frequency of the reciprocating vibration.

According to a second aspect of the present invention, in addition to the configuration of the control apparatus of the machine tool described in the first aspect, the vibration means is configured to reciprocatively vibrate the cutting tool and the workpiece relative to each other in the feeding direction. Thus, the foregoing problems are further solved.

According to a third aspect of the present invention, in addition to the configuration of the control apparatus of the machine tool described in the first or second aspect, the control apparatus of the machine tool includes: setting means configured to set the number of rotations of the imaginary spindle, the number of vibrations of the reciprocating vibration during one rotation of the imaginary spindle, and the vibration frequency as parameters and to set a value of at least one of the parameters to the control means; and correction means configured to set an unset parameter to a predetermined value and to correct, on the basis of the predetermined value of the unset parameter, the value of the parameter that is set by the setting means. Thus, the foregoing problems are further solved.

According to a fourth aspect of the present invention, in addition to the configuration of the control apparatus of the machine tool described in the first aspect, the spindle is configured to hold and rotate the workpiece. Thus, the foregoing problems are further solved.

According to a fifth aspect of the present invention, in addition to the configuration of the control apparatus of the machine tool described in the first aspect, the spindle is configured to hold and rotate the cutting tool. Thus, the foregoing problems are further solved.

According to a sixth aspect of the present invention, in addition to the configuration of the control apparatus of the machine tool described in the first aspect, the control means is provided to control the spindle by a program, and a dedicated parameter indicating a rotation start instruction for the imaginary spindle is added in the program to follow a value of the number of rotations of the imaginary spindle. Thus, the foregoing problems are further solved.

According to a seventh aspect of the present invention, in addition to the configuration of the control apparatus of the machine tool described in the first aspect, the control means is provided to control the spindle by a program, and the control means is connected to an external spindle which is not directly controlled by the program, and the control means is configured to send a rotation start instruction or a rotation stop instruction via the program to an external spindle drive unit which is configured to control the number of rotations of the external spindle, and to control the external spindle via the external spindle drive unit to start rotating and stop rotating. Thus, the foregoing problems are further solved.

According to an eighth aspect of the present invention, in addition to the configuration of the control apparatus of the machine tool described in the first aspect, the control means configured to control the rotating means and the vibration means is provided to control the spindle by a program, and the control means is configured to set the vibration frequency of the vibration means on the basis of the number of rotations set on the program with respect to the imaginary spindle and to machine the workpiece by vibrating the feeding means in a state where rotation of the spindle is stopped. Thus, the foregoing problems are further solved.

According to a ninth aspect of the present invention, a machine tool includes: a cutting tool configured to cut a workpiece; rotating means configured to rotate the cutting tool and the workpiece relative to each other; feeding means configured to feed the cutting tool and the workpiece in a predetermined feeding direction; vibration means configured to allow relative reciprocating vibration between the cutting tool and the workpiece; and a control apparatus including control means configured to perform cutting of the workpiece by feeding the cutting tool with reciprocating vibration toward the workpiece, wherein the control means includes an imaginary spindle regarded as a spindle for rotating the workpiece or the cutting tool, and the control means is configured to set the number of rotations of the imaginary spindle and the number of vibrations of the reciprocating vibration during one rotation of the imaginary spindle in accordance with the vibration frequency of the reciprocating vibration. Thus, the foregoing problems are solved.

According to a tenth aspect of the present invention, in addition to the configuration of the machine tool described in the ninth aspect, the vibration means is configured to reciprocatively vibrate the cutting tool and the workpiece relative to each other in the feeding direction. Thus, the foregoing problems are solved.

According to an eleventh aspect of the present invention, in addition to the configuration of the machine tool described in the ninth or tenth aspect, the machine tool includes: setting means configured to set the number of rotations of the imaginary spindle, the number of vibrations of the reciprocating vibration during one rotation of the imaginary spindle, and the vibration frequency as parameters and to set a value of at least one of the parameters to the control means; and correction means configured to set a unset parameter to a predetermined value and to correct, on the basis of the predetermined value of the unset parameter, the value of the parameter that is set by the setting means. Thus, the foregoing problems are solved.

According to the control apparatus of the machine tool of the present invention, in accordance with conditions defined by the control means, the machine tool allows the cutting tool to be fed in the feeding direction while reciprocatively vibrating, and thereby the machine tool can smoothly cut the workpiece while separating chips. Also, the imaginary spindle imaginarily regarded as the spindle for rotating the workpiece is configured as the spindle, for example, on the software, and the control means includes the imaginary spindle. The imaginary spindle is targeted in place of the spindle, and thus the vibration frequency of the vibration means is set without rotating the spindle and the vibration means vibrates. Therefore, flexibility in machining the workpiece is increased and vibration cutting can be performed without rotating the spindle.

Also, according to the machine tool of the present invention, the workpiece can be smoothly cut by the control apparatus of the machine tool, and in addition, flexibility in machining the workpiece is increased and vibration cutting can be performed without rotating the spindle.

BRIEF DESCRIPTION OF THE DRAWINGS

FIG. 5 is a chart showing the relationship between the instruction cycle and the vibration frequency according to the embodiment of the present invention.

FIG. 8 is diagram showing a portion of a machining program according to the embodiment of the present invention.

DETAILED DESCRIPTION

A control apparatus of a machine tool and the machine tool according to an aspect of the present invention may be embodied in any manner as long as control means includes an imaginary spindle regarded as a spindle for rotating a workpiece or a cutting tool, and the control means is configured to set the number of rotations of the imaginary spindle and the number of vibrations of reciprocating vibration during one rotation of the imaginary spindle in accordance with the vibration frequency of the reciprocating vibration, and thus in accordance with conditions set by the control means, the machine tool allows the cutting tool to be fed in the feeding direction with reciprocatively vibrating and thereby can smoothly cut the workpiece while separating chips, and the machine tool increases flexibility in machining the workpiece and performs vibration cutting without rotating the spindle.

Figure 1:
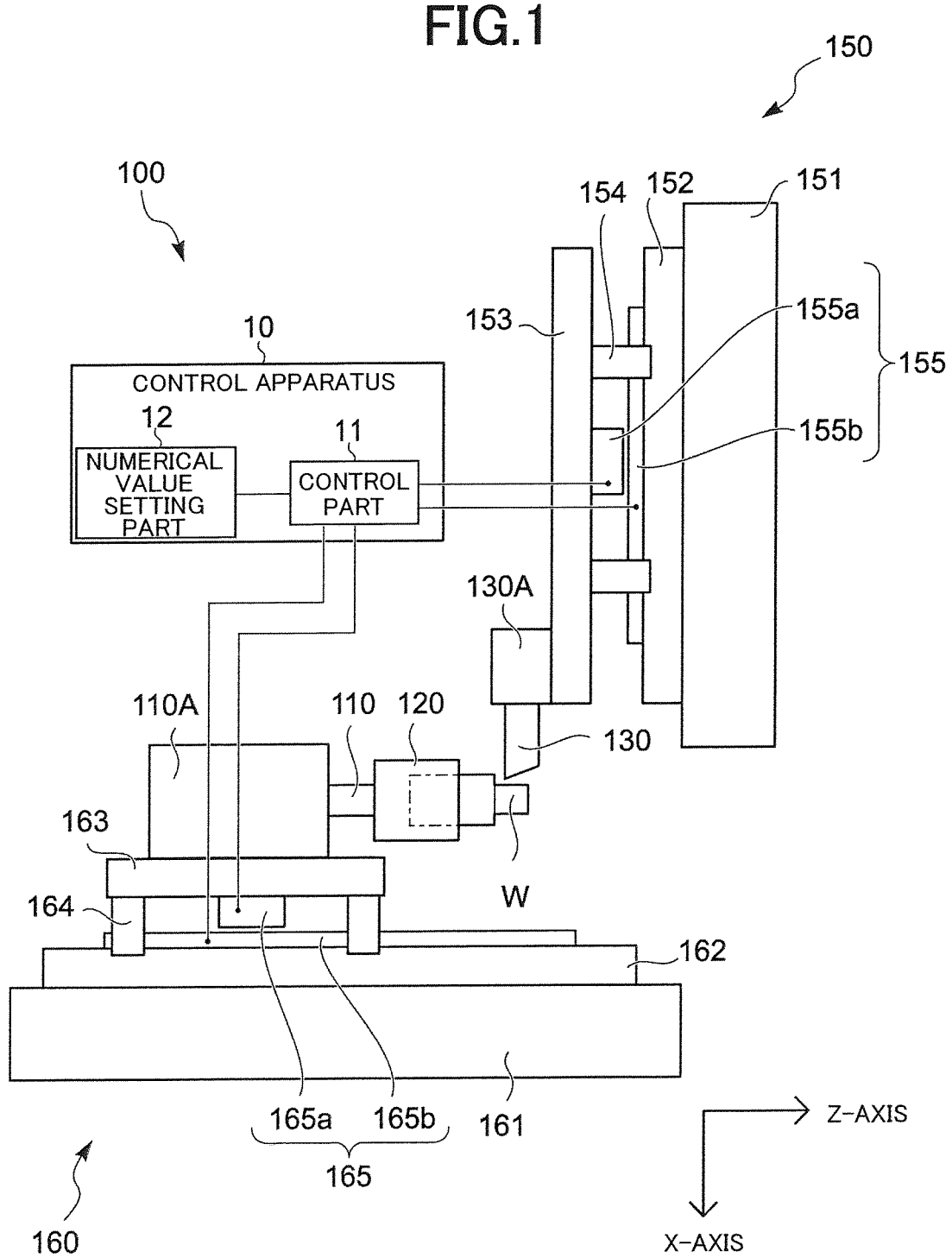
FIG. 1 is a schematic view showing a machine tool according to an embodiment of the present invention.

FIG. 1 is a schematic view showing a machine tool 100 including a control apparatus 10 according to an embodiment of the present invention. The machine tool 100 includes a spindle 110 and a cutting tool rest 130A. A chuck 120 is provided at an end of the spindle 110. The spindle 110 is configured as workpiece holding means to hold a workpiece W via the chuck 120. The spindle 110 is supported by a spindle stock 110A so as to be rotatably driven by power from a spindle motor (not shown). A conventionally known built-in motor or the like formed between the spindle stock 110A and the spindle 110 may be used as the spindle motor in the spindle stock 110A.

The spindle stock 110A is mounted on a bed side of the machine tool 100 so as to be movable in a Z-axis direction, which is an axis direction of the spindle 110, by a Z-axis direction feeding mechanism 160. The spindle 110 is configured to be moved via the spindle stock 110A in the Z-axis direction by the Z-axis direction feeding mechanism 160. The Z-axis direction feeding mechanism 160 is a spindle moving mechanism configured to move the spindle 110 in the Z-axis direction.

The Z-axis direction feeding mechanism 160 includes: a base 161 integral with a fixed side of the Z-axis direction feeding mechanism 160, such as the bed; and a Z-axis direction guide rail 162 provided on the base 161 and extending in the Z-axis direction. A Z-axis direction feeding table 163 is slidably supported by the Z-axis direction guide rail 162 via Z-axis direction guides 164. A mover 165*a* of a linear servo motor 165 is provided on the side of the Z-axis direction feeding table 163, and a stator 165*b* of the linear servo motor 165 is provided close to the base 161.

The spindle stock 110A is mounted on the Z-axis direction feeding table 163, and the Z-axis direction feeding table 163 is configured to be movably driven in the Z-axis direction by the linear servo motor 165. The spindle stock 110A is moved in the Z-axis direction according to the movement of the Z-axis direction feeding table 163, thereby moving the spindle 110 in the Z-axis direction.

A cutting tool 130, such as a tool bit, configured to cut the workpiece W is attached to the cutting tool rest 130A; therefore, the cutting tool rest 130A is tool rest that holds the cutting tool 130. An X-axis direction feeding mechanism 150 is provided on the bed side of the machine tool 100.

The X-axis direction feeding mechanism 150 includes: a base 151 integral with the bed side; and an X-axis direction guide rail 152 extending in an X-axis direction, which is orthogonal to the Z-axis direction in an up and down direction. The X-axis direction guide rail 152 is fixed to the base 151, and an X-axis direction feeding table 153 is slidably supported by the X-axis direction guide rail 152 via X-axis direction guides 154. The cutting tool rest 130A is mounted on the X-axis direction feeding table 153.

A linear servo motor 155 includes a mover 155*a* and a stator 155*b*. The mover 155*a* is provided on the X-axis direction feeding table 153, and the stator 155*b* is provided close to the base 151. When the X-axis direction feeding table 153 is driven by the linear servo motor 155 to move along the X-axis direction guide rail 152 in the X-axis direction, the cutting tool rest 130A moves in the X-axis direction and thus the cutting tool 130 moves in the X-axis direction.

Additionally, a Y-axis direction feeding mechanism may be provided. The Y-axis direction is a direction orthogonal to the shown Z-axis and X-axis directions. The Y-axis direction feeding mechanism may be configured in the same way as the X-axis direction feeding mechanism 150.

The X-axis direction feeding mechanism 150 is mounted on the bed via the Y-axis direction feeding mechanism; whereby, a Y-axis direction feeding table is driven by a linear servo motor to be moved in the Y-axis direction and thus the cutting tool rest 130A can be moved in the Y-axis direction as well as the X-axis direction. Consequently, the cutting tool 130 can be moved in the X-axis direction and the Y-axis direction.

The Y-axis direction feeding mechanism may be mounted on the bed via the X-axis direction feeding mechanism 150 and the cutting table rest 130A may be mounted on the Y-axis direction feeding table.

The tool rest moving mechanism (the X-axis direction feeding mechanism 150 and the Y-axis direction feeding mechanism) and the spindle moving mechanism (the Z-axis direction feeding mechanism 160) operate cooperatively. Accordingly, the cutting tool rest 130A is moved in the X-axis direction by the X-axis direction feeding mechanism 150 and in the Y-axis direction by the Y-axis direction feeding mechanism, and the spindle stock 110A (spindle 110) is moved in the Z-axis direction by the Z-axis direction feeding mechanism 160. Therefore, the cutting tool 130 attached to the cutting tool rest 130A is fed toward the workpiece W in any feeding direction.

The rotation of the spindle 110 and the movement of the X-axis direction feeding mechanism 150, the Z-axis direction feeding mechanism 160, or the like are controlled by the control apparatus 10.

Figure 2:
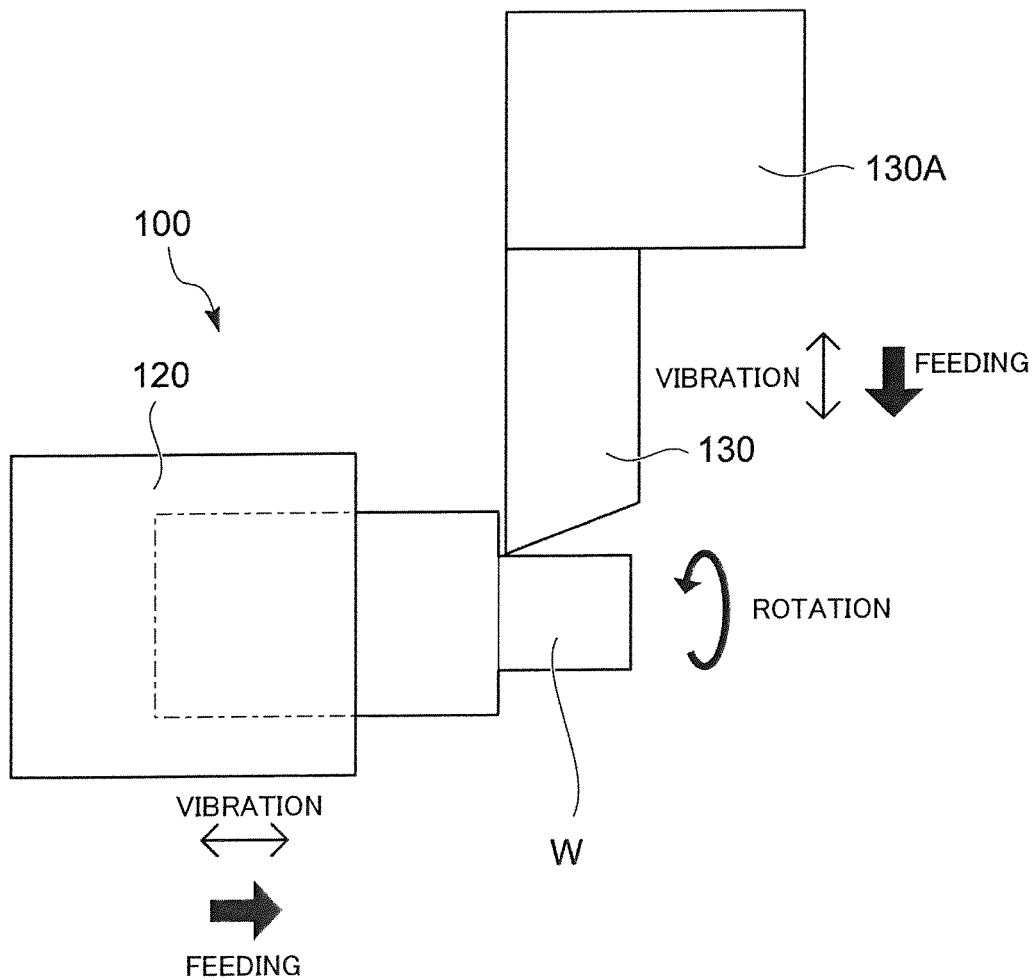
FIG. 2 is a schematic view showing the relationship between a cutting tool and a workpiece according to the embodiment of the present invention.

The spindle 110 and the cutting tool rest 130A are moved relative to each other by feeding means configured by the spindle moving mechanism and the tool rest moving mechanism, whereby the cutting tool 130 is fed toward the workpiece W in any feeding direction. Therefore, as shown in FIG. 2, the workpiece W can be cut with the cutting tool 130 into any shape.

In the present embodiment, both the spindle stock 110A and the cutting tool rest 130A are configured to be movable. Alternatively, the spindle stock 110A may be fixed on the bed side of the machine tool 100 so as not to be movable and the tool rest moving mechanism may be configured to move the cutting tool rest 130A in the X-axis direction, the Y-axis direction, and the Z-axis direction. In this case, the feeding means is configured by the tool rest moving mechanism that is configured to move the cutting tool rest 130A in the X-axis direction, the Y-axis direction, and the Z-axis direction, and the feeding means moves the cutting tool rest 130A toward the spindle 110 that is fixedly positioned but rotatably driven. Therefore, the cutting tool 130 can be fed in the feeding direction toward the workpiece W.

Alternatively, the cutting tool rest 130A may be fixed on the bed side of the machine tool 100 so as not to be movable and the spindle moving mechanism may be configured to move the spindle stock 110A in the X-axis direction, the Y-axis direction, and the Z-axis direction. In this case, the feeding means is configured by the spindle moving mechanism that is configured to move the spindle stock 110A in the X-axis direction, the Y-axis direction, and the Z-axis direction, and the spindle stock 110A is moved toward the cutting tool rest 130A that is fixedly positioned. Therefore, the cutting tool 130 can be fed in the feeding direction toward the workpiece W.

Also, in the present embodiment, the X-axis direction feeding mechanism 150, the Y-axis direction feeding mechanism, and the Z-axis direction feeding mechanism 160 are each configured to be driven by the linear servo motor but may be driven, for example, by a conventionally known ball screw and a conventionally known servo motor. Further, in the present embodiment, rotating means for rotating the workpiece W and the cutting tool 130 relative to each other is configured by the spindle motor such as the built-in motor. The spindle 110 is rotatably driven, whereby the workpiece W and the cutting tool 130 are rotated relative to each other.

Furthermore, in the present embodiment, the workpiece W is rotatable relative to the cutting tool 130. Alternatively, the cutting tool 130 may be rotatable relative to the workpiece W. In this case, a rotating tool such as a drill may be applied as the cutting tool 130.

A control part 11 included in the control apparatus 10 serves as control means. The rotation of the spindle 110 and driving of the Z-axis direction feeding mechanism 160, the X-axis direction feeding mechanism 150, and the Y-axis direction feeding mechanism are controlled. The control part 11 is set in advance so that the feeding mechanisms can also serve as vibration means and can be controlled to move the spindle stock 110A or the cutting tool rest 130A in respective moving directions while reciprocatively vibrating the spindle stock 110A or the cutting tool rest 130A in their respective moving directions.

Figure 3:
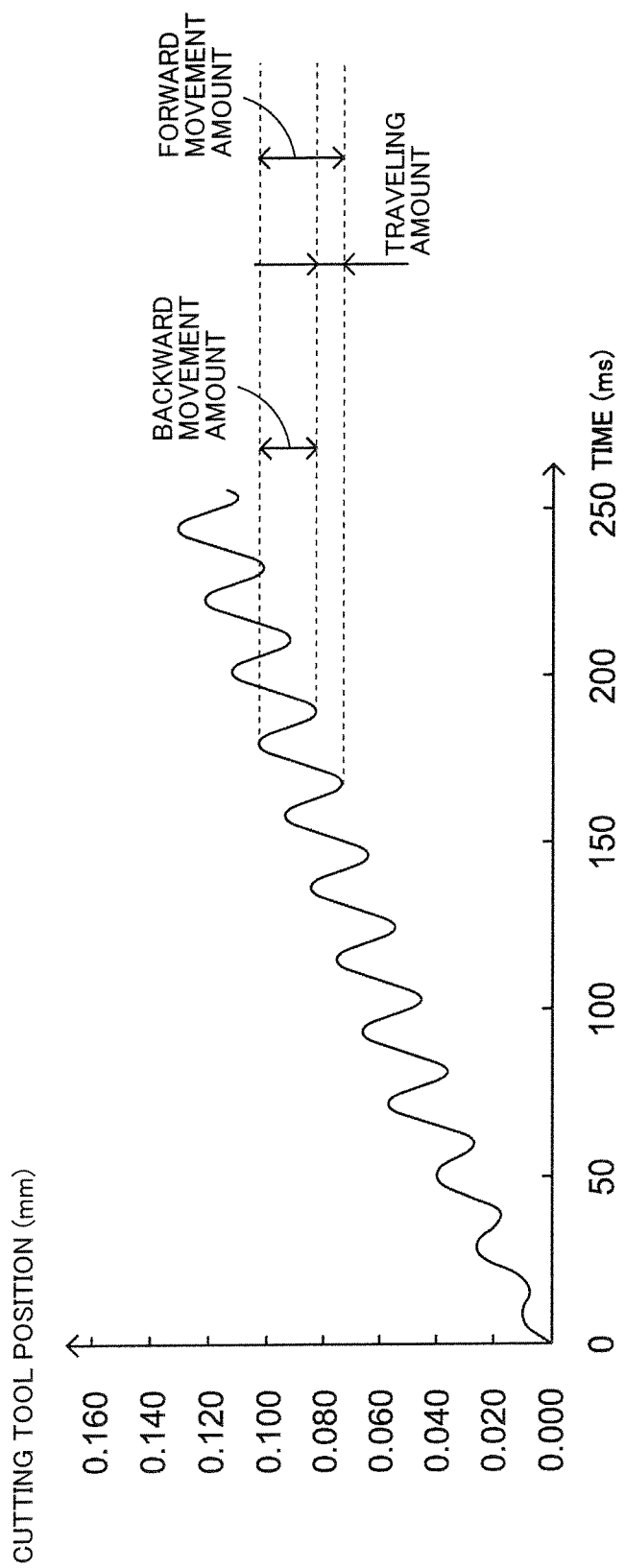
FIG. 3 is a graph showing the reciprocating vibration and a position of the cutting tool according to the embodiment of the present invention.

Each of the feeding mechanisms is controlled by the control part 11 to move the spindle 110 or the cutting tool rest 130A forward, in each reciprocating vibration, by a predetermined amount of forward movement and subsequently move the spindle 110 or the cutting tool rest 130A backward by a predetermined amount of backward movement amount; therefore, the spindle 110 or the cutting tool rest 130A is moved in each moving direction by a traveling amount that is the difference between the predetermined forward movement amount and the predetermined backward movement amount, as shown in FIG. 3. As a result, the feeding mechanisms cooperatively operate to feed the cutting tool 130 toward the workpiece W in the feeding direction.

The machine tool 100 allows the Z-axis direction feeding mechanism 160, the X-axis direction feeding mechanism 150, and the Y-axis direction feeding mechanism to feed the cutting tool 130 while reciprocatively vibrating the cutting tool 130 in the feeding direction by an amount of feed which is a total of the traveling amount during one rotation of the spindle, i.e., when the phase of the spindle has changed from 0 degrees to 360 degrees, thereby machining the workpiece W.

The spindle stock 110A (spindle 110) or the cutting tool rest 130A (cutting tool 130) moves while reciprocatively vibrating as the workpiece W is rotating; therefore, the outline of the workpiece W is cut into a predetermined shape by the cutting tool 130. In such a case, a circumferential surface of the workpiece W is cut by the cutting tool 130 into a sine-curve shape as shown in FIG. 4.

Figure 4:
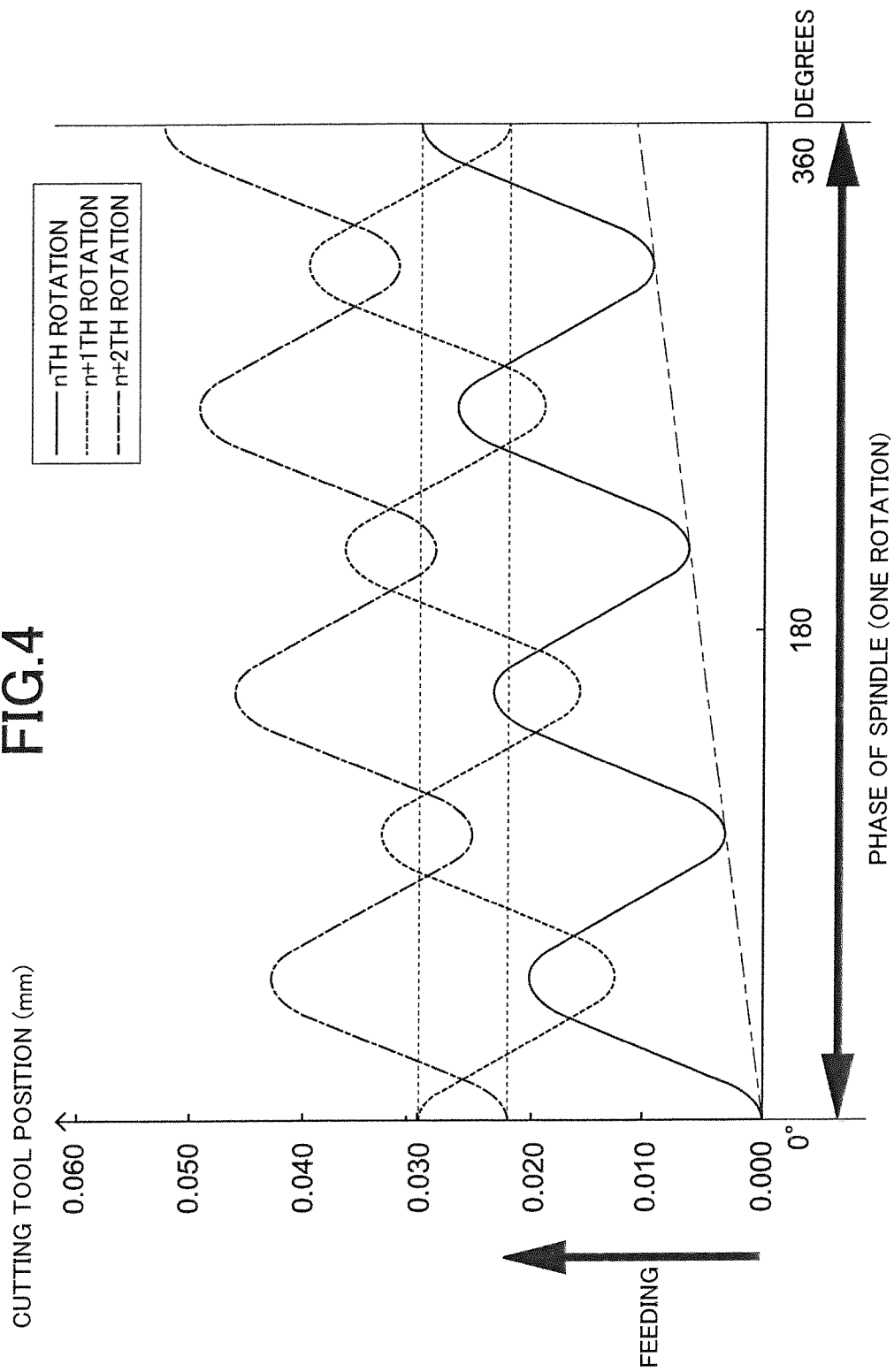
FIG. 4 is a graph showing the relationship among the nth rotation, the n+1th rotation, and the n+2th rotation of a spindle according to the embodiment of the present invention.

In FIG. 4, an imaginary straight line (an alternate long and short dash line) passing the bottom of a waveform of the sine-curve shape, shows the amount of change in position when the phase of the spindle has changed from 0 degrees to 360 degrees, and indicates the amount of feed. As shown in FIG. 4, a case where the number of vibrations N of the spindle stock 110A (spindle 110) or the cutting tool rest 130A during one rotation of the workpiece W is 3.5 (the number of vibrations N=3.5) will be described as an example.

In this case, the phase of the shape of the circumferential surface of the workpiece W cut with the cutting tool 130 during the n+1th rotation of the spindle 110 (where n is an integer equal to or larger than 1) is shifted from the phase of the shape of the circumferential surface of the workpiece W cut with the cutting tool 130 during the nth rotation of spindle 110 in a spindle phase direction (the horizontal axis on the graph). Therefore, the position of a lowest point at the bottom of the phase (the position of a peak point at the top on a dotted waveform graph, such as a cut point of the workpiece W cut furthest in the feeding direction with the cutting tool 130) during the n+1th rotation is shifted from the position of a lowest point at the bottom of the phase (the position of a peak point at the top on a solid waveform graph) during the nth rotation in the spindle phase direction.

Thus, a cut portion in the forward movement of the cutting tool 130 partially overlaps a cut portion in the backward movement of the cutting tool 130, which means that a portion of the circumferential surface of the workpiece W, which is cut during the n+1th rotation includes a portion of the circumferential surface of the workpiece W, which has been cut during the nth rotation. In such an overlapped portion, the cutting tool 130 does not cut the workpiece W at all. That is, the cutting tool 130 performs an "air cut." Chips generated from the workpiece W during the cutting work are sequentially separated by the air cut. Thus, the machine tool 100 can smoothly machine the outline of the workpiece W while separating chips via the reciprocating vibration of the cutting tool 130 in a cut-feeding direction.

In order to separate chips sequentially via the reciprocating vibration of the cutting tool 130, it is only necessary that a portion of the circumferential surface of the workpiece W, which is cut during the n+1th rotation includes a portion of the circumferential surface of the workpiece W, which has been cut during the nth rotation. In other words, a path traced by the cutting tool 130 on the circumferential surface of the workpiece W in the backward movement during the n+1th rotation of the workpiece W simply needs to reach a path traced by the cutting tool 130 on the circumferential surface of the workpiece W during the nth rotation.

The phase of the shape of the circumferential surface of the workpiece W cut with the cutting tool 130 during the n+1th rotation simply needs to be non-coincident with (not the same as) the phase of the shape of the circumferential surface of the workpiece W cut with the cutting tool 130 during the nth rotation of the workpiece W, and does not need to be a 180-degree inversion of the phase of the shape of the circumferential surface of the workpiece W cut with the cutting tool 130 during the nth rotation of the workpiece W. For example, the number of vibrations N may be 1.1, 1.25, 2.6, 3.75, or the like.

Alternatively, the number of vibrations N may be set so that the number of vibrations generated during one rotation of the workpiece W is smaller than 1 (0<the number of vibrations N<1.0). In this case, the spindle 110 rotates one rotation or more for each vibration. Also, the number of vibrations N can be set as the number of rotations of the spindle 110 for each vibration. In the machine tool 100, an operation instruction is issued by the control part 11 at a predetermined instruction cycle.

The reciprocating vibration of the spindle stock 110A (spindle 110) or the cutting tool rest 130A (cutting tool 130) can be performed at a predetermined frequency based on the instruction cycle. For example, if the machine tool 100 is configured such that 250 instructions per second can be issued by the control part 11, the operation instructions are issued by the control part 11 at a cycle of 4 ms (equivalent to 1/250), which is a reference cycle.

The instruction cycle is defined based on the reference cycle and is generally an integral multiple of the reference cycle. The reciprocating vibration can be performed at a frequency according to a value of the instruction cycle.

As shown in FIG. 5, for example, when 16 ms which is the quadruple of the reference cycle of 4 ms is defined as the instruction cycle, the forward and backward movements are performed every 16 ms. Thus, the spindle stock 110A (spindle 110) or the cutting tool rest 130A (cutting tool 130) can reciprocatively vibrate at a frequency of 62.5 Hz, which is equivalent to 1/(0.004×4).

Alternatively, the spindle stock 110A (spindle 110) or the cutting tool rest 130A (cutting tool 130) can reciprocatively vibrate at a frequency of 50 Hz, which is equivalent to 1/(0.004×5), 41.666 Hz, which is substantially equivalent to 1/(0.004×6), 35.714 Hz, which is substantially equivalent to 1/(0.004×7), 31.25 Hz, which is equivalent to 1/(0.004×8), or the like.

The frequency f (in Hz), as a vibration frequency at which the spindle stock 110A (spindle 110) or the cutting tool rest 130A (cutting tool 130) reciprocatively vibrates, can be defined as a value selected from the frequencies described above.

Also, the control apparatus 10 (control part 11) can set the instruction cycle by multiplying the reference cycle (4 ms) by multipliers other than integral numbers. In this case, a frequency according to such an instruction cycle can be applied as the vibration frequency.

Figure 6:
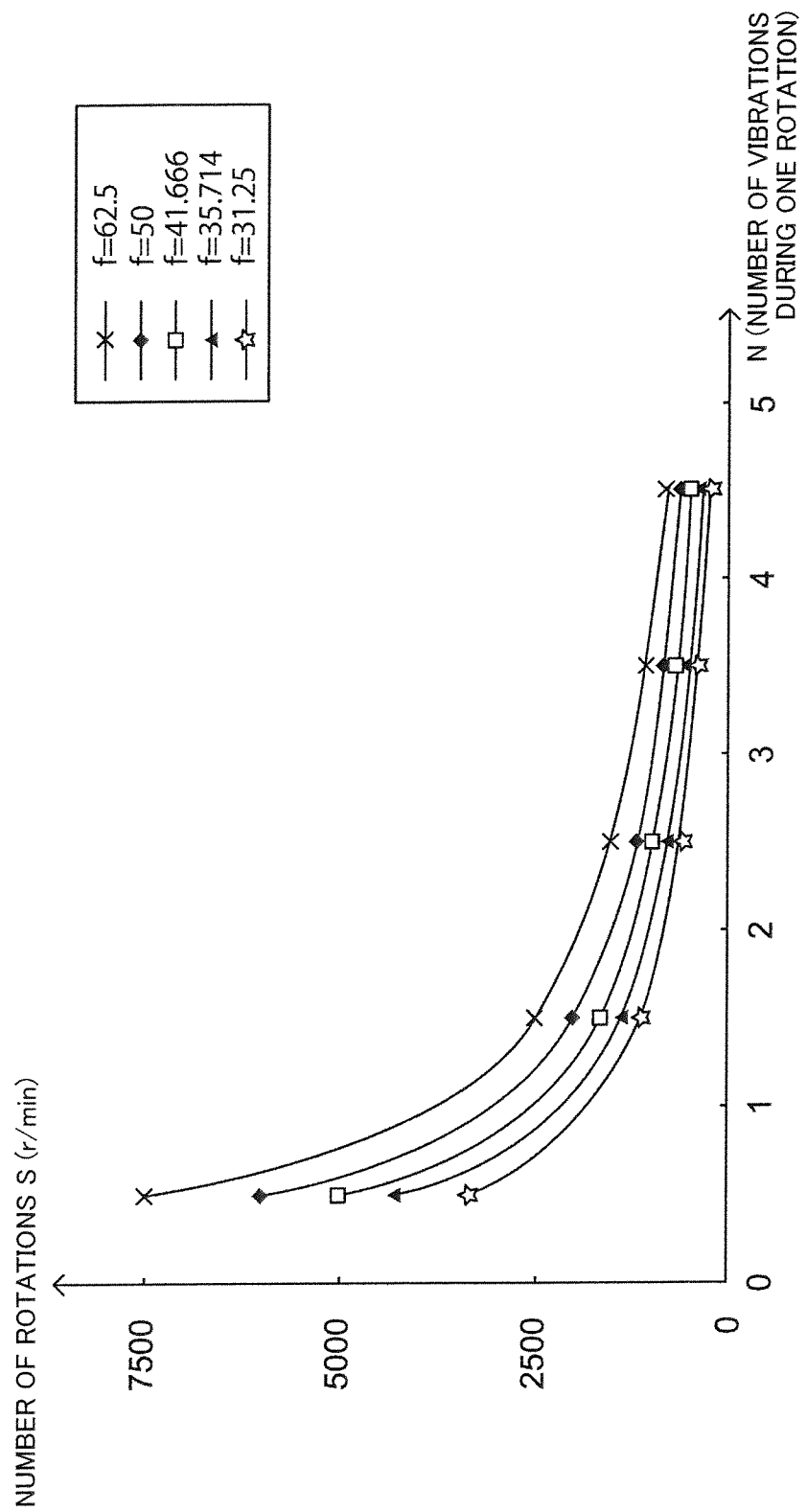
FIG. 6 is a graph showing the relationship among the number of vibrations, the number of rotations, and the vibration frequency.

When the number of rotations S of the spindle 110 is defined as S (rotations/minute) in the case of reciprocating vibration of the spindle stock 110A (spindle 110) or the cutting tool rest 130A (cutting tool 130), the number of vibrations N is defined as N=f×60/S. Thus, as shown in FIG. 6, the number of rotations S and the number of vibrations N are inversely related to each other when the vibration frequency f is a constant. The spindle 110 can rotate at a higher speed when the vibration frequency f has a higher value or when the number of vibrations N has a smaller value.

In the machine tool 100 according to the present embodiment, the number of rotations S, the number of vibrations N, and the vibration frequency f are set as parameters, and a user can set the number of rotations S and the number of vibrations N of the three parameters via a numerical value setting part 12 or the like to the control part 11. Thus, in order to set the number of rotations S or the number of vibrations N to the control part 11, an operator can enter a value of the number of rotations S or the number of vibrations N as a parameter value into the control part 11. A value of the number of rotations S or the number of vibrations N may be written in a machining program. Alternatively, the number of vibrations N may be set as an argument in a program block (on one line in the program).

When setting means is configured such that the number of vibrations N can be particularly set as an argument in the program block of the machining program, the user can easily set the number of rotations S and the number of vibrations N from the machining program with the number of rotations S of the spindle 110, which is generally written on the machining program and the number of vibrations N, which is written as the argument in the program block. Setting by the setting means may be performed through a program or may be performed by the user via the numeral value setting part 12.

The control part 11 controls the spindle stock 110A or the cutting tool rest 130A to move while reciprocatively vibrating on the basis of the set number of rotations S and the set number of vibrations N, so that the spindle 110 is rotated at the set number of rotations S and so that the cutting tool 130 is fed in the feeding direction while reciprocatively vibrating at the set number of vibrations N in the feeding direction.

Also, the number of rotations S and the number of vibrations N are defined based on the vibration frequency f as described above. Therefore, the control part 11 includes correction means configured to correct the set number of rotations S and the set number of vibrations N on the basis of the vibration frequency f.

The correction means sets the vibration frequency f on the basis of N=60f/S, so that the vibration frequency f has a value near a value calculated from the set number of vibrations N and the set number of rotations S, and the correction means can correct the number of vibrations N and the number of rotations S with the set vibration frequency f to values near their respective set values.

For example, the number of rotations and the number of vibrations can be respectively set by the user at S=3000 (r/min) and N=1.5. In this case, a vibration frequency of 75 Hz is derived from S=3000 (r/min) and N=1.5. Therefore, the correction means sets the vibration frequency f, for example, at 62.5 Hz. Thus, the correction means may correct the number of vibrations N to 1.25 on the basis of the set vibration frequency f (62.5 Hz) while, for example, maintaining the number of rotations S (3000 r/min). Alternatively, the correction means may correct the number of rotations S to 2500 r/min on the basis of the set vibration frequency f (62.5 Hz) while, for example, maintaining the number of vibrations N (1.5).

Also, the vibration frequency f is set at 50 Hz and thereby the number of rotations S and the number of vibrations N can be corrected to 2400 r/min and 1.25, respectively.

In any of such cases, in accordance with machining conditions, one of the number of rotations S and the number of vibrations N is corrected in priority over the other, or both the number of rotations S and the number of vibrations N are corrected. Thus the correcting conditions can be changed. Alternatively, the user sets the vibration frequency f used by the setting means in advance, and then the number of vibrations N or the number of rotations S can be corrected in accordance with the set vibration frequency f.

Also, of the three parameters, the number of vibrations N or the number of rotations S entered into the control part 11 is set via the numerical value setting part 12 or the like. Alternatively, for example, the number of vibrations N may be fixed in advance at a predetermined value so as to avoid the necessity of entering the number N, and only the number of rotations S is set by the user as one of the three parameters. Then, the vibration frequency f is set according to the fixed number of vibrations N and the set number of rotations S. Thereby the number of vibrations N or the number of rotations S may be corrected in accordance with the set vibration frequency f.

Further, if only the number of rotations S is set by the user as one of the three parameters, the control part 11 may be configured to calculate the number of vibrations with respect to the set number of rotations S for each vibration frequency and to set the number of vibrations N at which chips are separated via the reciprocating vibration of the cutting tool 130 without correcting the set number of rotations S. In this case, with respect to the number of rotations S set by the user, the control part 11 performs the reciprocating vibration of the cutting tool 130 at the vibration frequency f, which corresponds to the number of vibrations N set by the control part 11. However, if it is difficult to set the number of vibrations N at which chips are separated as described above according to the user's set number of rotations S or the user's set operable vibration frequency, the control part 11 may be configured to adjust the amplitude of the reciprocating vibration to a value that allows chips to be separated.

Figure 7:
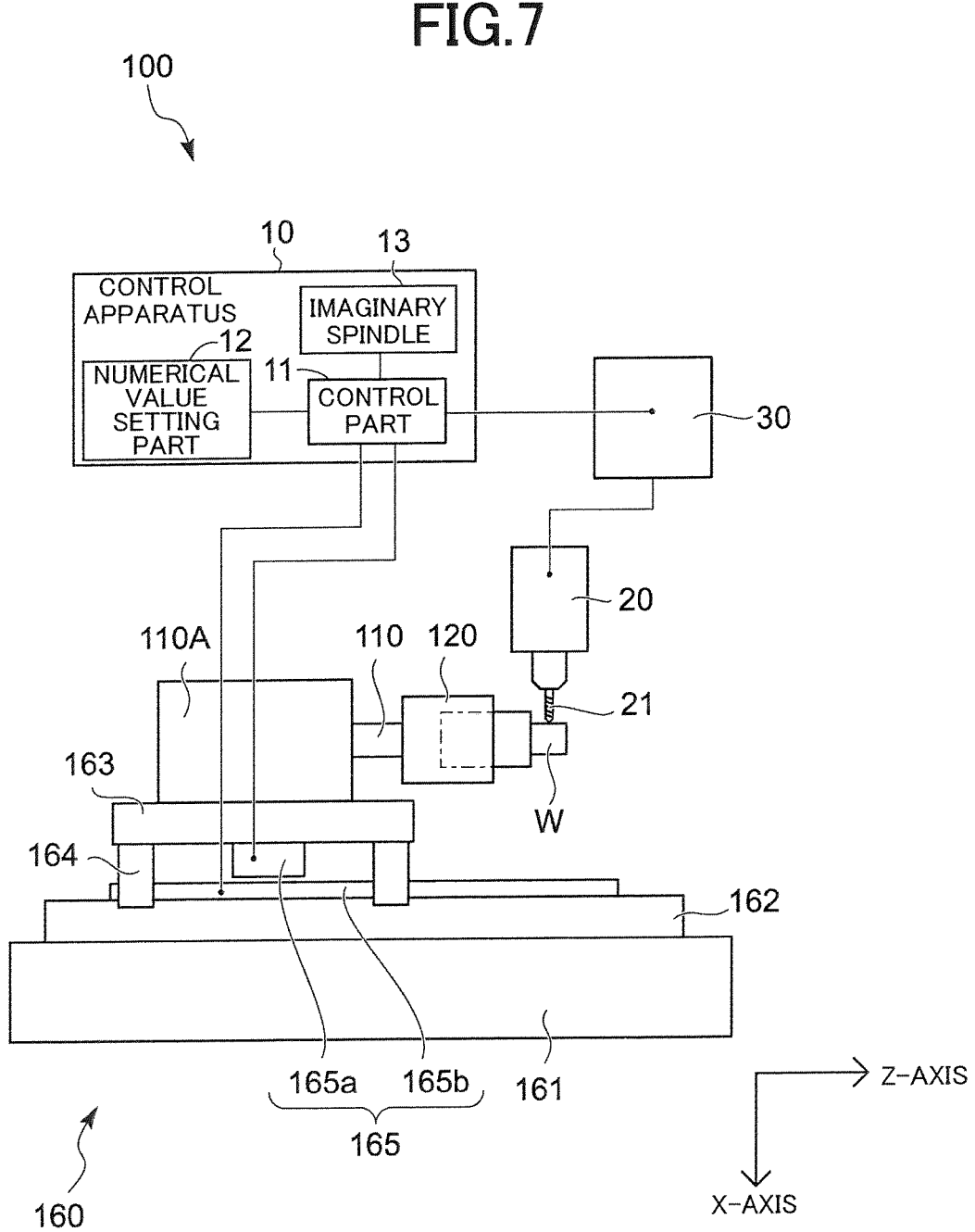
FIG. 7 is a schematic view showing a mode in which an external spindle and an external spindle drive unit are applied in the machine tool according to another embodiment of the present invention.

As shown in FIG. 7, the control apparatus 10 is configured such that the control part 11 includes an imaginary (i.e., a virtual) spindle 13, configured on the software to be imaginarily regarded as a spindle for rotating the workpiece W. When functioning as the correction means, the control part 11 is configured to correct, in accordance with the predefined setting, the number of rotations of the imaginary spindle 13 instead of the spindle 110, and the number of vibrations of the reciprocating vibration, during one rotation of the imaginary spindle 13. For example, a value of the number of rotations S of the spindle 110 can be written and set in the machining program, and a value of the number of vibrations N can be set as an argument in the program block. Thus, the number of rotations S or the number of vibrations N can be set in the control part 11. In such a case, an imaginary spindle rotation start code can be provided. The imaginary spindle rotation start code is writable in the machining program, explicitly indicating to the control part 11 that the set number of rotations is the number of rotations of the imaginary spindle 13.

Because the imaginary spindle rotation start code is written in the machining program, the control part 11 regards the value of the number of rotations written in the machining program as being the number of rotations of the imaginary spindle 13, and the control part 11 can be set to function as the correction means that corrects the number of rotations of the imaginary spindle 13 or the number of reciprocating vibrations during one rotation of the imaginary spindle 13. In other words, on the basis of reading of the imaginary spindle rotation start code, the control part 11 regards the number of rotations set by the setting means as being the number of rotations of the imaginary spindle 13. Then, in accordance with the user-set number of rotations of the imaginary spindle 13 or the user-set number of reciprocating vibrations during one rotation of the imaginary spindle 13, the control part 11 corrects and sets the number of reciprocating vibrations. Accordingly, the control part 11 allows the feeding mechanisms as the vibration means to move the spindle stock 110A or the cutting tool rest 130A in respective moving directions while reciprocatively vibrating the spindle stock 110A or the cutting tool rest 130A in the respective moving directions. Therefore, the cutting tool 130 is fed in the feeding direction with reciprocating vibration toward the workpiece W.

As described above, instead of the spindle 110, the imaginary spindle 13 is intended to feed the cutting tool 130 in the feeding direction with reciprocating vibration toward the workpiece W. Thus, for example, even in a state where the rotation of the spindle 110 is stopped, the cutting tool 130 can be fed in the feeding direction with reciprocating vibration toward the workpiece W.

For example, an external spindle 20, which is not directly controlled by the machining program and an external spindle drive unit 30, which is connected to the external spindle 20 to control the number of rotations of the external spindle 20, can be applied in the machine tool 100.

A spindle number, which is assigned to the spindle 110 as a component of the machine tool 100, for example a spindle number other than S1, such as S101, is assigned to the imaginary spindle 13 as its spindle number. In this way, any number of rotations can be set to the imaginary spindle 13. For example, as shown in FIG. 8, when S101=3970, 3970 r/min can be set as a value of the number of rotations of the imaginary spindle 13. Also, when the imaginary spindle rotation start code is, for example, M403, the imaginary spindle rotation start code M403 is written in the program block that is configured to set the number of rotations of the imaginary spindle 13. Therefore, the control part 11 sets the vibration frequency f on the basis of the number of rotations set to the imaginary spindle 13 and the number of vibrations N set by the setting means, and can thereby correct the number of vibrations N and the number of rotations with the set vibration frequency f to values near their respective set values.

For setting the number of vibrations, the control part 11 is configured to be instructed by a command GΔΔΔ P1 in the machining program to start vibration cutting in which the cutting tool 130 is fed in the feeding direction while reciprocatively vibrating in the feeding direction. In such a case, the number of vibrations N can be set as a value following argument D in a command GΔΔΔ.

Thus, on the basis of the corrected number of rotations and the corrected number of vibrations N, the control part 11 can instruct the imaginary spindle 13 to rotate at the corrected number of rotations and can control the spindle stock 110A or the cutting tool rest 130A to move while reciprocatively vibrating so that the cutting tool 130 is fed in the feeding direction while reciprocatively vibrating at the corrected number of vibrations N in the feeding direction.

Since the imaginary spindle 13 is configured on the software and the control part 11 regards the imaginary spindle 13 configured on the software as being rotating at the set number of rotations, the spindle 110 does not need to rotate physically. Thus, according to user operation or instructions of the machining program, the external spindle 20 is rotated via the external spindle drive unit 30 at the number of rotations corrected by the control part 11; whereby, the vibration cutting can be performed by the external spindle 20 even in a state where the spindle 110 is stopped.

Also, in a state where vibrations are generated by the vibration means after correction and setting without rotating the spindle 110, drilling for making holes such as circular holes can be performed on the workpiece W with chips separated by a drill 21 attached to the external spindle 20.

Also, in the control part 11, an amplitude feed ratio can be set as a value following Q (argument Q) in the command GΔΔΔ. The amplitude feed ratio is a ratio between the amount of feed when the phase of the spindle has changed from 0 degrees to 360 degrees and the amplitude of reciprocating vibration generated by the vibration means and is a value obtained by dividing the amplitude by the amount of feed.

In order to set the amplitude feed ratio of "2.0", "Q 2.0" is written following GΔΔΔ. In order to set the number of vibrations to "0.5", "D 0.5" is written following GΔΔΔ in the machining program. Thus, the number of vibrations N and the amplitude feed ratio can be set in the control part 11.

In the example of FIG. 8, the control part 11 is configured such that the stopping of vibration cutting (stopping of vibration) is instructed by a command GΔΔΔ P0 in the machining program. Also, when an imaginary spindle rotation stop code is, for example, M405, the imaginary spindle rotation stop code M405 is written in the machining program. Therefore, the control part 11 reads in the imaginary spindle rotation stop code and then regards the rotation of the imaginary spindle 13, which is regarded as being rotating in the software, as having stopped.

Figure 9:
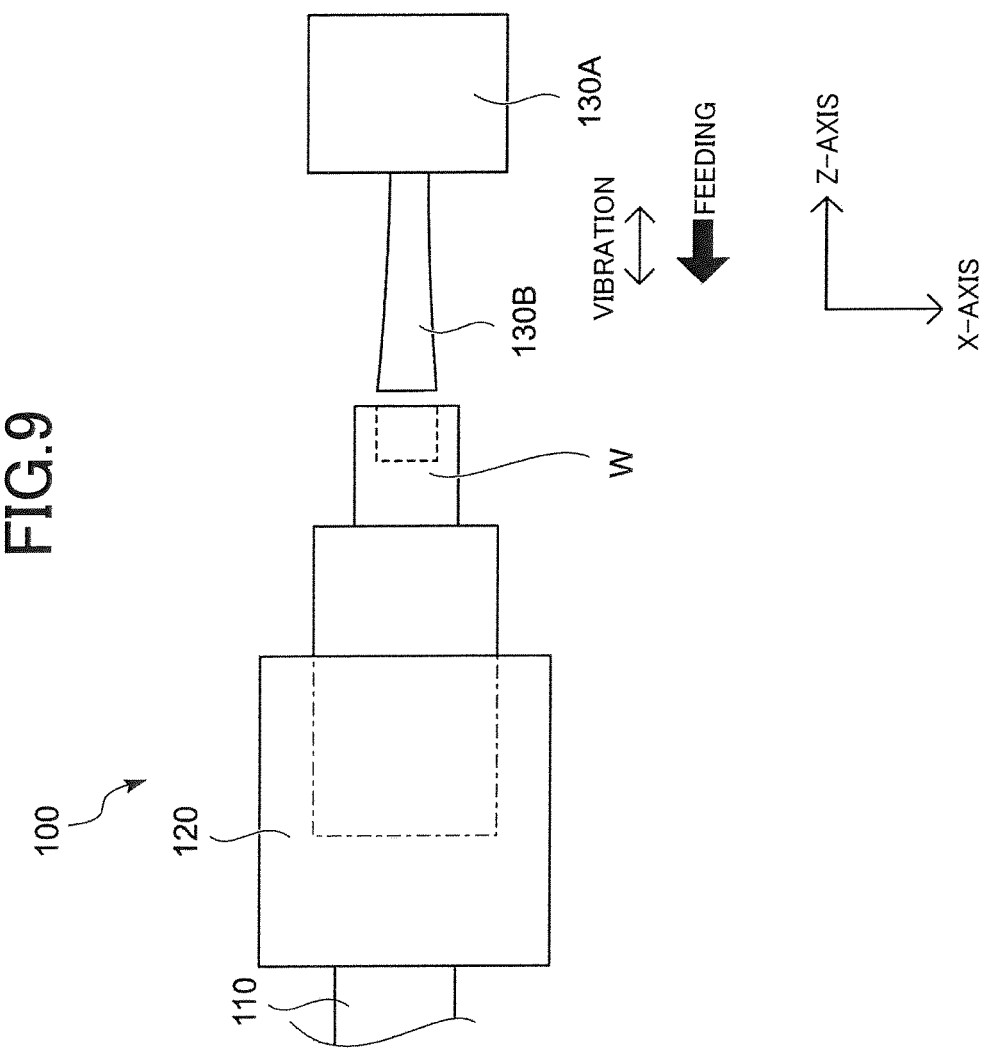
FIG. 9 is a schematic view showing the relationship between the cutting tool (a broach) and the workpiece according to the embodiment of the present invention.
Figure 10:
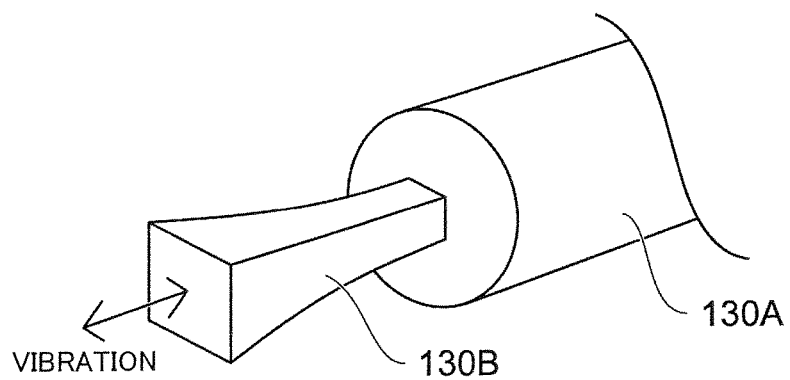
FIG. 10 is a perspective view of the cutting tool (broach).

For example, as shown in FIG. 9 and FIG. 10, a broach 130B for a broach machining, as an example of the cutting tool, is attached to the cutting tool rest 130A, and the broach 130B is fed in a feeding direction while vibrating in a state where the spindle 110 is not rotated. Thus, broaching can be performed on the workpiece W.

The control apparatus 10 of the machine tool 100, according to the above-described embodiment of the invention, includes the imaginary spindle 13 configured in the software to be imaginarily regarded as the spindle 110 for rotating the workpiece W. Further, the number of rotations of the imaginary spindle 13, the number of vibrations N of the reciprocating vibration during one rotation of the imaginary spindle 13, and the vibration frequency f attributable to the cycle during which the operation instruction can be issued by the control part 11, are set as the parameters. Furthermore, the control apparatus 10 includes: the setting means configured to set, for example, a value of the number of rotations of the imaginary spindle 13 as at least one of the parameters; and the correction means configured to set, for example, the number of vibrations N and the vibration frequency f to predetermined values as unset parameters, and to correct, on the basis of a value of the vibration frequency f, the parameters set by the setting means, such as the value of the number of rotations of the imaginary spindle 13 and the value of the number of vibrations N. Therefore, the control apparatus 10 can perform vibration cutting via reciprocating vibration without rotating the spindle 110.

In the embodiment described above, a case where the spindle or the cutting tool rest moves forward by a predetermined amount of forward movement and then moves backward by a predetermined amount of backward movement, is described as the reciprocating vibration by the vibration means in the moving direction. Alternatively, the reciprocating vibration can be performed by repeating the forward movement as a relative movement at a predetermined first speed and stopping at zero speed in the feeding direction in place of the backward movement, as a relative movement at a second speed slower than the first speed.

Also, in place of the backward movement as the relative movement at the second speed, a movement at a speed slower than the first speed in the same direction as the forward movement at the first speed in the feeding direction can be utilized. These alternating forward movements at the first and seconds speeds may be repeated.

In any of the above cases, chips are easily separated and break at a location where the width of the chips generated from the workpiece W is small.

The invention claimed is:

1. A machine tool comprising:
a cutting tool cutting a workpiece;
a spindle rotating the workpiece;
a feeding mechanism feeding the cutting tool and the workpiece in a predetermined machining feeding; direction, and
generating relative reciprocating vibration between the cutting tool and the workpiece; and
a controller configured to be controlled by a program that controls the cutting tool, the spindle, and the feeding mechanism to execute machining of the workpiece by a feeding operation of relatively reciprocating and vibrating at least one of the cutting tool and workpiece while feeding the cutting tool or the workpiece in the machining feed direction;
wherein the program sets a number of rotations of the spindle per unit time, a number of vibrations of the reciprocating vibration per cycle of the spindle and vibration frequency of the reciprocating vibration in the controller after causing the controller to calculate the vibration frequency of the reciprocating vibration from the number of rotations of the spindle per unit time and the number of vibrations of the reciprocating vibration per cycle of the spindle, and
wherein the program causes the controller to execute a first machining of the workpiece by the feeding operation while rotating the spindle based on the number of rotations of the spindle per unit time, the number of vibrations of the reciprocating vibration per cycle of the spindle and the vibration frequency of the reciprocating vibration in the controller, and
wherein the program further sets a number of vibrations of the reciprocating vibration per cycle of the spindle and a vibration frequency of the reciprocating vibration to be calculated in the controller after causing the controller to calculate the vibration frequency of the reciprocating vibration from the number of rotations of the spindle per unit time and the number of vibration of the reciprocating vibration per cycle of the spindle and sets the number of rotations of the spindle per unit time by zeroing the number of rotations of the spindle per unit time in the controller, and
wherein the program is configured to causes the controller to execute also second machining, being different from the first machining of the workpiece by the feed operation while stopping rotation of the spindle based on the set values.

2. The machine tool according to claim 1, wherein the feeding mechanism reciprocatively vibrates the cutting tool and the workpiece relative to each other in the feeding direction.

3. The machine tool according to claim 1, wherein the program causes the controller to:
correct the calculated vibration frequency of the reciprocating vibration to a vibration frequency caused by an operating command of the controller,
correct at least one of the number of rotations of the spindle per unit time and the number of vibration of the reciprocating vibration per cycle of the spindle based on the corrected vibration frequency, and
execute the first machining by setting these values, and
wherein the program causes the controller to:
correct the calculated vibration frequency of the reciprocating vibration to a vibration frequency cause by an operating command of the controller,
correct at least one of the number of rotations of the spindle per unit time and the number of vibration of the reciprocating vibration per cycle of the spindle based on the corrected vibration frequency, and
execute the second machining by zeroing the number of rotations of the spindle per unit time.

4. The machine tool according to claim 1, wherein the program causes the controller to control the rotation of the spindle,
wherein the controller is connected to an external spindle which is not directly controlled by the program,
wherein the program causes the controller to send one of rotation start instruction and a rotation stop instruction to an eternal spindle drive unit that controls the number of rotations of the external spindle, and
wherein the program causes the controller controls the to control, via the external spindle drive unit, the starting and stopping of rotation of the external spindle.

* * * * *